US011244227B2

(12) United States Patent
Asai

(10) Patent No.: US 11,244,227 B2
(45) Date of Patent: Feb. 8, 2022

(54) DISCRETE FEATURE REPRESENTATION WITH CLASS PRIORITY

(71) Applicant: INTERNATIONAL BUSINESS MACHINES CORPORATION, Armonk, NY (US)

(72) Inventor: Masataro Asai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 16/290,250

(22) Filed: Mar. 1, 2019

(65) Prior Publication Data
US 2020/0279164 A1 Sep. 3, 2020

(51) Int. Cl.
*G06N 3/08* (2006.01)
*G06K 9/62* (2006.01)
*G06N 20/00* (2019.01)
*G06N 3/04* (2006.01)

(52) U.S. Cl.
CPC ............. *G06N 3/082* (2013.01); *G06K 9/628* (2013.01); *G06N 3/0481* (2013.01); *G06N 20/00* (2019.01)

(58) Field of Classification Search
CPC ...... G06N 3/082; G06N 20/00; G06N 3/0481; G06K 9/628
USPC .......................................................... 706/25
See application file for complete search history.

(56) References Cited

U.S. PATENT DOCUMENTS

| 2016/0247064 | A1* | 8/2016 | Yoo ...................... G06N 3/0445 |
| 2017/0230675 | A1 | 8/2017 | Wierstra et al. |
| 2019/0197403 | A1* | 6/2019 | Schmidhuber ........... G06N 3/08 |
| 2020/0118000 | A1* | 4/2020 | Schmidt ................... G06N 3/04 |

OTHER PUBLICATIONS

Lee, et al., "Structure Level Adaptation for Artificial Neural Networks", Springer Science + Business Media, LLC, 1991 (Year: 1991).*
Jang et al., "Categorical Reparameterization with Gumbel-Softmax", arXiv:1611.01144v5 [stat.ML] Aug. 5, 2017 (Year: 2017).*
Maulik, et al., "Simulated annealing based automatic fuzzy clustering combined with ANN classification for analyzing microarray data", Computers & Operations Research 37 (2010) 1369-1380 (Year: 2010).*
Poultney, Christopher et al., "Efficient learning of sparse representations with an energy-based model," Advances in neural information processing systems, 2007, pp. 1137-1144.
Gong, Yunchao, et al., "Compressing deep convolutional networks using vector quantization," arXiv preprint, Dec. 2014, 10 pages, 1412, 6115.
Wu, Jiaxiang, et al., "Quantized convolutional neural networks for mobile devices," Proceedings of the IEEE Conference on Computer Vision and Pattern Recognition, 2016, pp. 4820-2828.

(Continued)

*Primary Examiner* — Tsu-Chang Lee
(74) *Attorney, Agent, or Firm* — Tutunjian & Bitetto, P.C.; Randall Bluestone

(57) ABSTRACT

A discrete neural network is trained by training a neural network having an output layer so as to output discrete values. The output layer includes a plurality of nodes. Each node corresponding to one of a plurality of classes. The training includes activating the nodes by priority according to the corresponding class.

20 Claims, 12 Drawing Sheets

(56) References Cited

OTHER PUBLICATIONS

Courbariaux, Matthew, et al., "Binaryconnect: Training deep neural networks with binary weights during propagations," Advances in neural information processing systems, 2015, pp. 3123-3131.
Rastegari, Mohammad, et al., "Xnor-net: Imagenet classification using binary convolutional neural networks," European Conference on Computer Vision, Oct. 2016, pp. 525-542.
Hanson, Stephen Jose, et al., "Comparing biases for minimal network construction with back-propagation," Advances in neural information processing systems, 1989, pp. 177-185.
Srinivas, Suraj, et al., "Data-free parameter pruning for deep neural networks," arXiv preprint, Jul. 2015, 12 pages, 1507, 06149.
Lebedev, Vadim, et al., "Fast convnets using group-wise brain damage," Proceedings of the IEEE Conference on Computer Vision and Pattern Recognition, 2016, pp. 2554-2564.
Zhou, Hao, et al., "Less is more: Towards compact cnns," European Conference on Computer Vision, Oct. 2016, pp. 662-677.
Rigamonti, Roberto, et al., "Learning separable filters," Proceedings of the IEEE conference on computer vision and pattern recognition, 2013, pp. 2754-2761.
Denton, Emily L., et al., "Exploiting linear structure within convolutional networks for efficient evaluation," Advances in neural information processing systems, 2014, pp. 1269-1277.
Bucilua, Christian, et al., "Model compression," Proceedings of the 12th ACM SIGKDD international conference on Knowledge discovery and data mining, ACM, Aug. 2006, pp. 535-541.
Ba, Jimmy, et al., "Do deep nets really need to be deep?," Advances in neural information processing systems, 2014, pp. 2654-2662.
Vahdat, Arash, et al., "DVAE++: Discrete variational autoencoders with overlapping transformations," arXiv preprint, Feb. 2018, 16 pages, 1802, 04920.
Van Den Oord, Aaron, et al., "Neural discrete representation learning," Advances in Neural Information Processing Systems, 2017, pp. 6306-6315.

\* cited by examiner

DISCRETE FEATURE REPRESENTATION WITH CLASS PRIORITY

BACKGROUND

Technical Field

The present invention relates to discrete feature representation with class priority of neural networks.

Description of the Related Art

In the field of computer science, problem solvers that give solutions to problems (e.g., the 8-puzzle) have been developed. Since the problem solvers do not directly handle problems as they are (e.g., image of tiles of the 8-puzzle), it is necessary to transform the problems into discrete representations thereof.

Discrete autoencoders can output a discrete representation of input data. However, conventional discrete autoencoders can be difficult to train. Even if successfully trained, they may only produce an unstable representation that is not ideal for problem solving. Therefore, the conventional autoencoders require careful fine-tuning which can consume an excessive amount of computational resources.

SUMMARY

According to an embodiment of the present invention, a computer-implemented method is provided for neural network training. The computer-implemented method includes training a neural network having an output layer so as to output discrete values, wherein the output layer includes a plurality of nodes, each node corresponding to one of a plurality of classes, and wherein the training includes activating the nodes by priority according to the corresponding class.

The foregoing embodiment can also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the method.

The summary clause does not necessarily describe all features of the embodiments of the present invention. Embodiments of the present invention can also include sub-combinations of the features described above.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
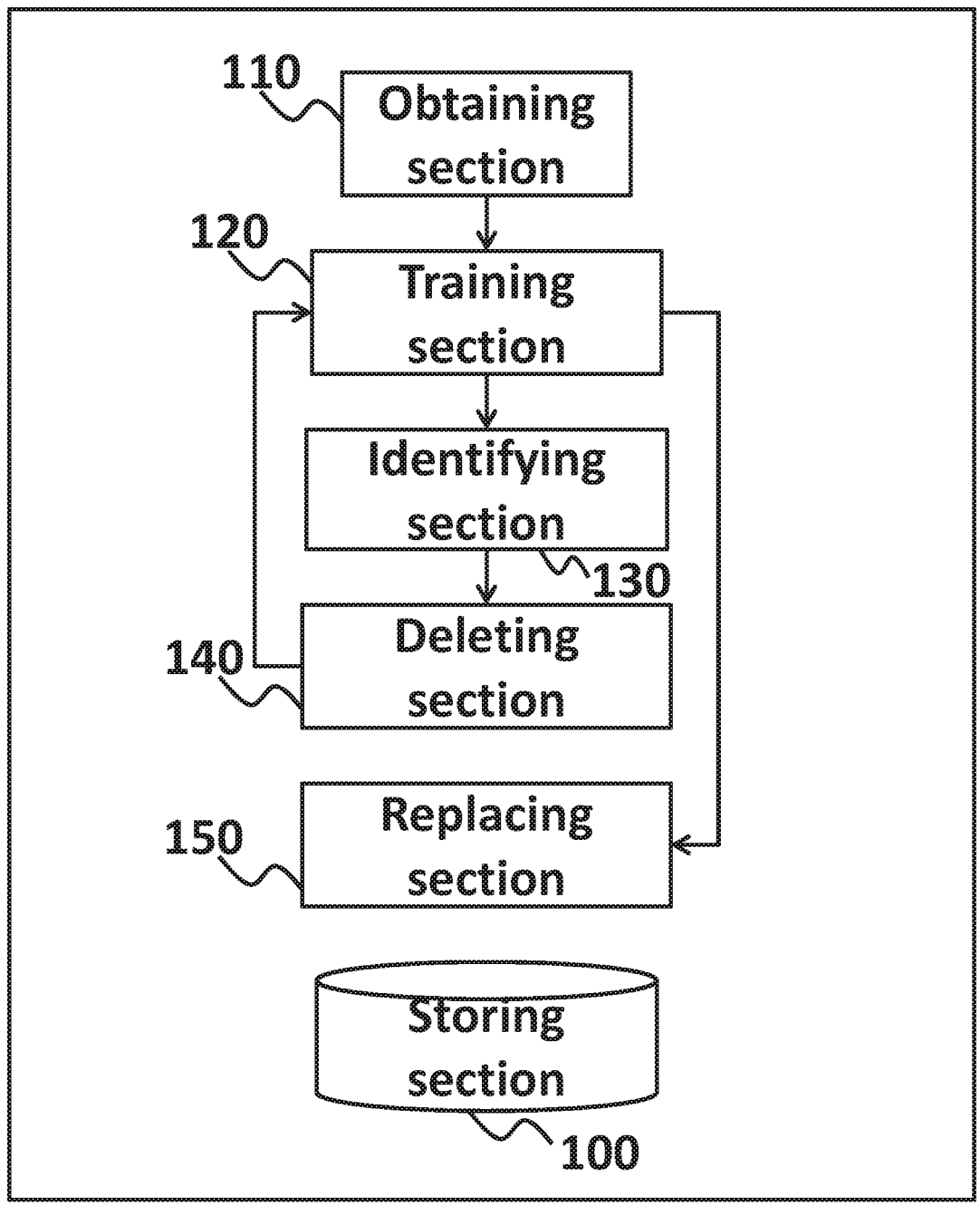
FIG. 1 shows an exemplary configuration of an apparatus 10, according to an embodiment of the present invention.

FIG. 1 shows an exemplary configuration of an apparatus 10, according to an embodiment of the present invention. The apparatus 10 can train discrete neural networks by activating nodes with priority. Thereby, the apparatus 10 can generate a stable and accurate trained neural network much faster and/or with less computational resources.

The apparatus 10 can include a processor and/or programmable circuitry. The apparatus 10 can further include one or more computer readable mediums collectively including instructions. The instructions can be embodied on the computer readable medium and/or the programmable circuitry. The instructions, when executed by the processor or the programmable circuitry, can cause the processor or the programmable circuitry to operate as a plurality of operating sections.

Thereby, the apparatus 10 can be regarded as including a storing section 100, an obtaining section 110, a training section 120, an identifying section 130, a deleting section 140, and a replacing section 150.

The storing section 100 stores information used for the processing that the apparatus 10 performs. The storing section 100 can also store a variety of data/instructions used for operations of the apparatus 10. One or more other elements in the apparatus 10 (e.g., the obtaining section 110, the training section 120, the identifying section 130, the deleting section 140, and the replacing section 150) can communicate data directly or via the storing section 100, as necessary.

The storing section 100 can be implemented by a volatile or non-volatile memory of the apparatus 10. In some embodiments, the storing section 100 can store neural networks, parameters, and other data related thereto.

The obtaining section 110 obtains a plurality of training data used for training of a neural network. The obtaining section 110 can obtain other data necessary for operations of the apparatus 10. The obtaining section 110 can provide the training section 120 with the plurality of training data.

The training section 120 can train a neural network by using the plurality of training data provided by the training section 110. The neural network can have an input layer, one or more hidden layers, and an output layer. In an embodiment, the training section 120 can train a neural network so as to output discrete values from the output layer. Thereby, the training section 120 can train a discrete neural network.

Figure 2:
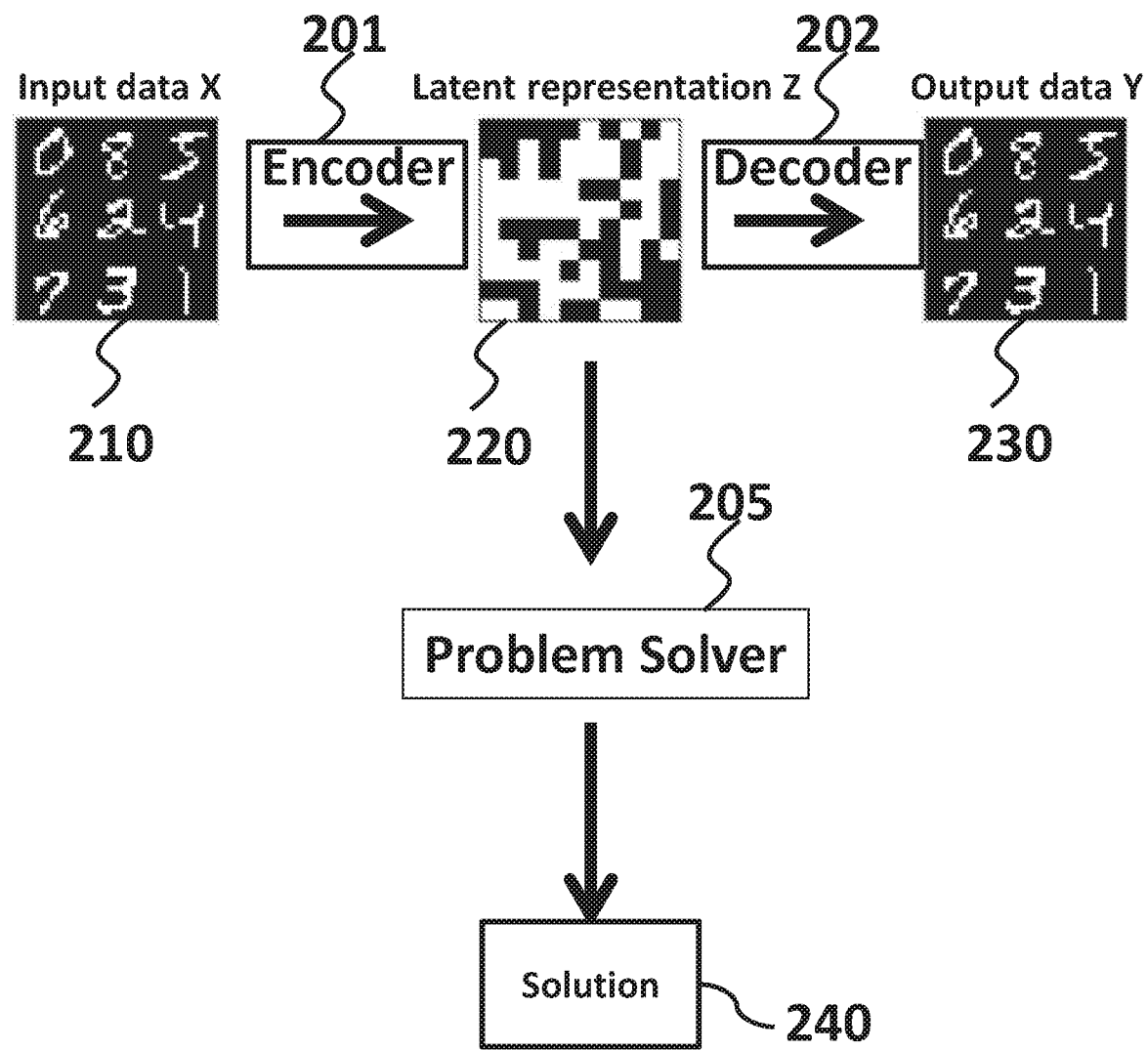
FIG. 2 shows a neural network according to an embodiment of the present invention.

FIG. 2 shows a neural network according to an embodiment of the present invention. In an embodiment, training section 120 can train at least a part of an autoencoder, such as a Variational Autoencoder (VAE) as the neural network. In the embodiment, the neural network can include an encoder 201. In the embodiment, the training section 120 can also train a decoder 202.

The encoder 201 can transform input data X 210 into a latent representation Z 220. The decoder 202 can transform the latent representation Z 220 into an output data Y 230, which is expected to be substantially the same as the input data X 210. The latent representation Z 220 can include essential information to restore the input data X 210.

By applying a problem solver 205 to the latent representation Z 220, the problem solver can generate a solution 240 for a problem corresponding to the input data X 210.

Figure 3:
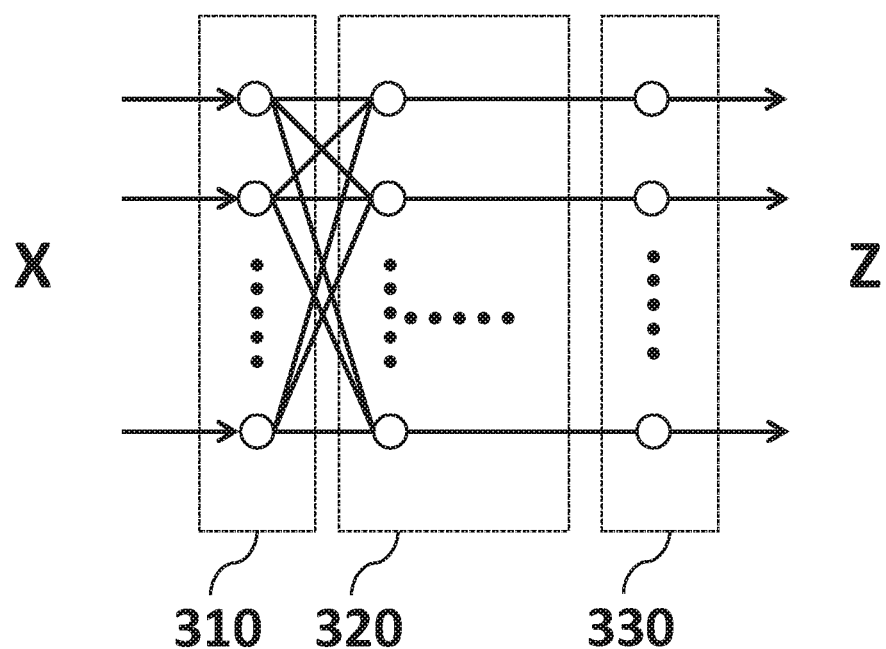
FIG. 3 shows a neural network according to an embodiment of the present invention.

FIG. 3 shows a neural network according to an embodiment of the present invention. In an embodiment, the neural network in FIG. 3 can be an encoder of a VAE. The encoder can include an input layer 310, a hidden layer 320, and an output layer 330. Although the hidden layer 320 is represented by a single layer in FIG. 3, the hidden layer 320 can include one or more layers.

As shown in FIG. 3, the output layer 330 can include a plurality of nodes. Each node of the plurality of nodes can correspond to one of a plurality of classes. The training section 120 (shown in FIG. 1) can train the neural network so as to activate the nodes of the output layer by priority according to the corresponding class. The training section 120 can use a softmax layer (e.g., Gumbel softmax layer) as the output layer 330 during the training. The output layer 330 can correspond to a latent layer or a hidden layer of an autoencoder. Details of the output layer 330 are explained below.

With reference to FIG. 1, the training section 120 can provide the identifying section 130 with information of the neural network (e.g., a weight of each node, output of each node, and/or other parameters of the neural network) during and/or after the training. After the training, the training section 120 can provide the replacing section 150 with a trained neural network.

The identifying section 130 can identify a set of nodes of the output layer that may not be contributing outputs of the neural network during the training. The identifying section 130 can provide the deleting section 140 with the information of the identified set of nodes. Details of operations of the identifying section 130 are explained below.

The deleting section 140 can delete the set of nodes identified by the identifying section 130 from the neural network during or after the training.

The replacing section 150 can replace the output layer used at the training with an argmax layer. Then, the replacing section 150 can provide the neural network to another apparatus (such as a problem solver) for runtime, or the apparatus 10 can use the neural network for runtime.

Figure 4:
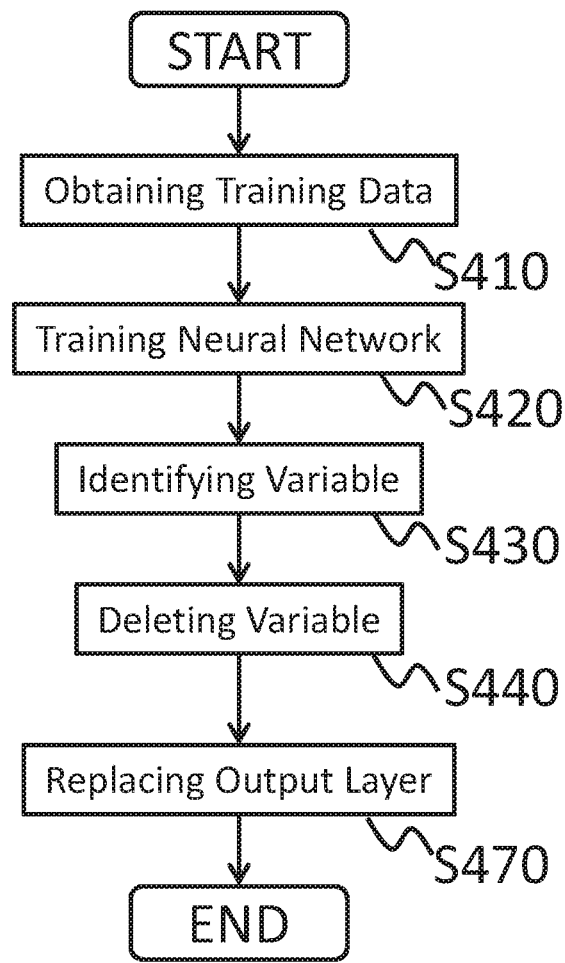
FIG. 4 shows an operational flow according to an embodiment of the present invention.

FIG. 4 shows an operational flow according to an embodiment of the present invention. The present embodiment describes an example in which an apparatus, such as the apparatus 10 shown in FIG. 1, performs operations from S410 to S470, as shown in FIG. 4, to generate a neural network.

At S410, an obtaining section such as the obtaining section 110 can obtain a plurality of training data. In an embodiment, each training data can include an image (e.g., images of a puzzle problem). In other embodiments, the each training data can be other types of data, such as audio data, text data, video data, etc.

At S420, a training section such as the training section 120 can train a neural network. The training section can train the neural network with the plurality of training data provided by the obtaining section.

In an embodiment, the training section can train a VAE, of which encoder outputs discrete values. The encoder of the VAE can be a neural network shown by FIG. 3, and include the output layer 330.

Figure 5:
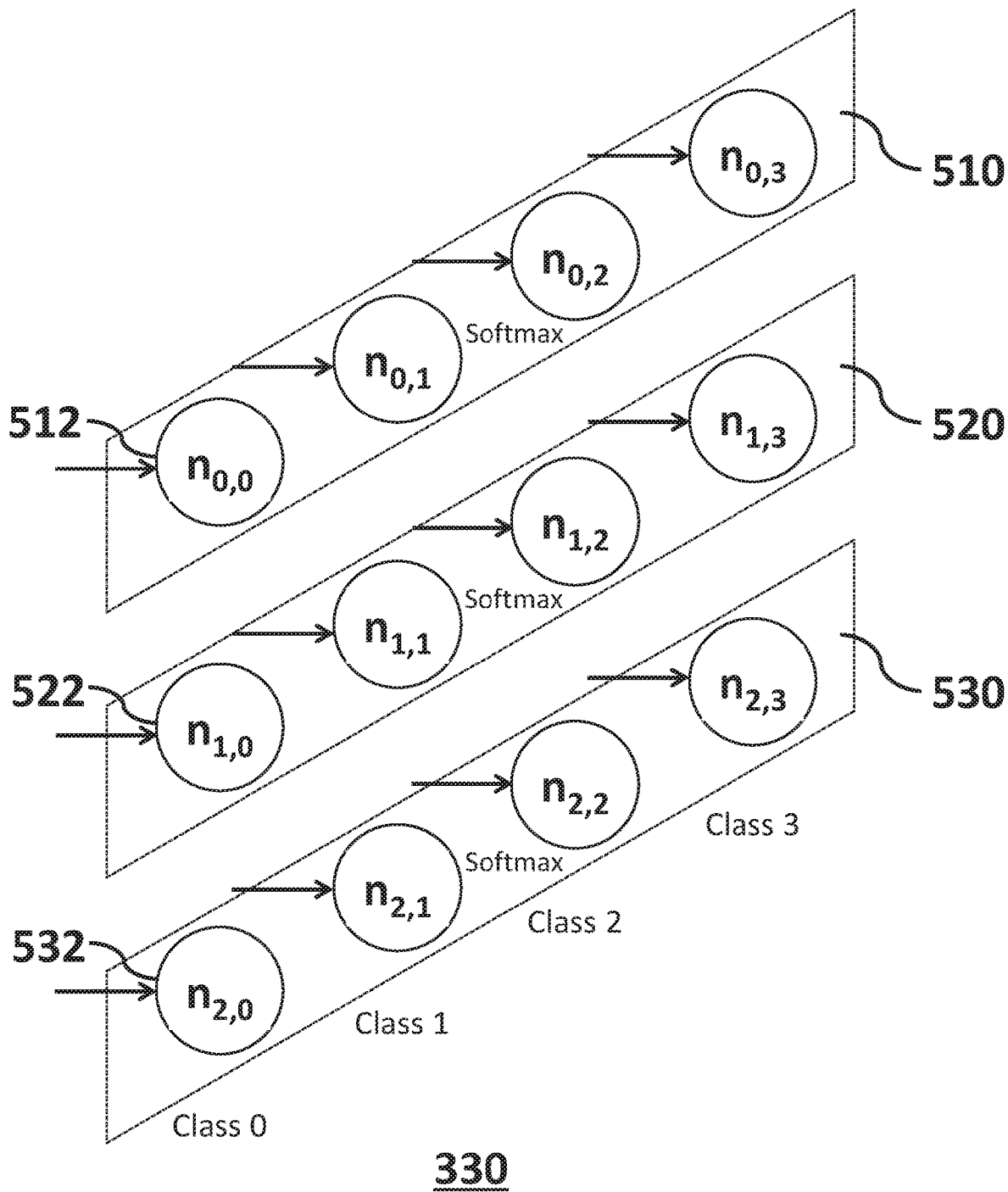
FIG. 5 shows a structure of the output layer 330 according to an embodiment of the present invention.

FIG. 5 shows a structure of the output layer 330 of the encoder according to an embodiment of the present invention. In the embodiment of FIG. 5, the output layer 330 can include a node $n_{0,0}$, a node $n_{0,1}$, a node $n_{0,2}$, a node $n_{0,3}$, a node $n_{1,0}$, a node $n_{1,1}$, a node $n_{1,2}$, a node $n_{1,3}$, a node $n_{2,0}$, a node $n_{2,1}$, a node $n_{2,2}$, and a node $n_{2,3}$.

The output layer 330 can include a plurality of sets of nodes, and each set of nodes can correspond to one of a plurality of variables. In the embodiment of the present invention shown in FIG. 5, the output layer 330 has a first set 510, a second set 520, and a third set 530. The first set 510 corresponds to a first variable, the second set 520 corresponds to a second variable, and the third set 530 corresponds to a third variable.

Each of the plurality of sets can include one of the plurality of nodes corresponding each class. In the embodiment of shown in FIG. 5, the first set 510 includes the nodes 512 $n_{0,0} \ldots n_{0,3}$, the second set 520 includes the nodes 522 $n_{1,0} \ldots n_{1,3}$, and the third set 530 includes the nodes 532 $n_{2,0} \ldots n_{2,3}$. The nodes $n_{0,0} \ldots n_{2,0}$ belong to Class 0, the nodes $n_{0,1} \ldots n_{2,1}$ belong to Class 1, the nodes $n_{0,2} \ldots n_{2,2}$ belong to Class 2, and the nodes $n_{0,3} \ldots n_{2,3}$ belong to Class 3. In the embodiment, a node $n_{i,j}$ is regarded as belonging to Class j in i-th variable.

In an embodiment, a plurality of nodes of each variable can function as a Gumbel softmax layer. In the embodiment, the plurality of nodes of each variable (e.g., nodes $n_{0,2} \ldots n_{0,3}$) can calculate a softmax value base at least on logit values of outputs from nodes in a previous layer (such as the last layer of the hidden layer 320) connected to the output layer 330 and a sample of a predetermined distribution.

In a specific embodiment, a node $n_{i,j}$ can calculate a softmax value $z_{i,j}$ from the following equation:

$$z_{i,j} = \text{Softmax}_j\left(\frac{\text{logit}_{i,j} + g_{i,j}}{\tau}\right), \quad \text{EQ1}$$

where $\text{logit}_{i,j}$ is a logit value computed from the outputs of nodes that are in the previous layer and are connected to the node $n_{i,j}$, $g_{i,j}$ is a sample of the predetermined distribution such as Gumbel distribution, and $\tau$ is a temperature parameter.

The temperature parameter $\tau$ can be used for annealing during the training by decreasing $\tau$ from a certain positive value to 0. As $\tau$ approaches 0, the softmax value $z_{i,j}$ approaches a discrete value, such as 0 or 1, from a continuous value, such as 0.33, 0.55, etc. In an example, when $\tau$ becomes substantially 0, the nodes $n_{0,0} \ldots n_{0,3}$ of a set of the first variable 510 can output (1, 0, 0, 0), the nodes $n_{1,0} \ldots n_{1,3}$ of a set of the second variable 520 can output (0, 1, 0, 0), and the nodes $n_{2,0} \ldots n_{2,3}$ of a set of the third variable 530 can output (0, 0, 0, 1).

Returning to FIG. 4, at S420, the training section trains the neural network so as to activate the nodes of the output layer by priority according to the corresponding class. The training section can put a higher priority on some classes and a lower priority on other classes during the training.

In an embodiment, the training section can regularize each class by minimizing a network loss function that applies a penalty term associated with the priority of the corresponding class.

Figure 6:
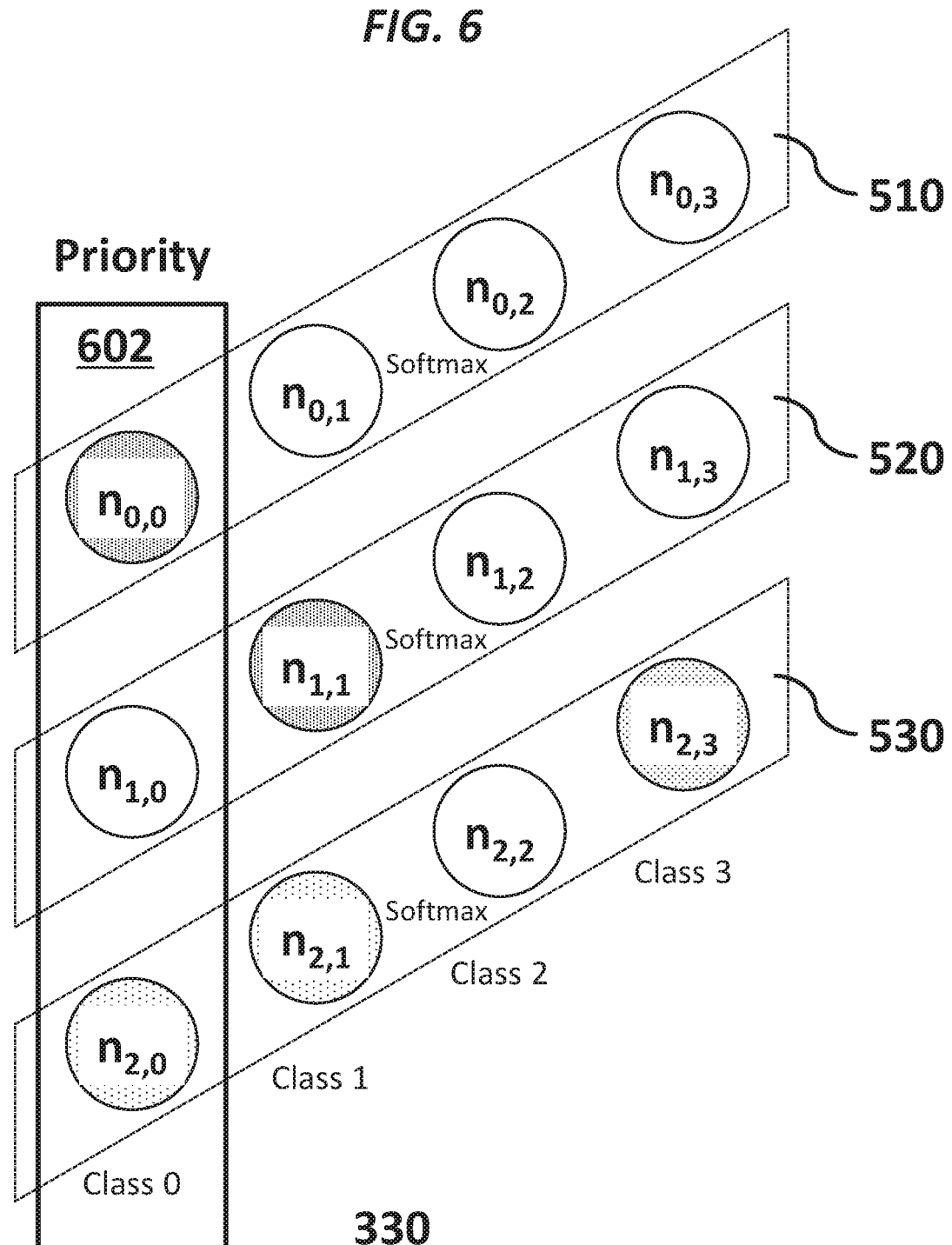
FIG. 6 shows a class priority during the training according to an embodiment of the present invention.

FIG. 6 shows a class priority during the training according to an embodiment of the present invention. In the embodiment of FIG. 6, the training section can put a priority 602 on Class 0 and no priority on Classes 1-3. In an aspect, Class 0 is a prioritized class, and Classes 1-3 are non-prioritized classes. During the training, the training section can use the network loss function including activation levels of the plurality of nodes except one class, such as Class 0.

In a specific embodiment, the training section can use $\|Y-X\|+<\text{GS variational loss}>+\alpha\Sigma_{j\neq 0}|z_{i,j}|$ as the network loss function, where $\|Y-X\|$ is an error between the input data X and output data Y, $\alpha$ is a balance parameter and can be more than 0. <GS variational loss> can be defined as: $\lambda\Sigma_{i,j}[\text{Softmax}_j^i(\text{logit}_{i,j})\log(\text{Softmax}_j^i(\text{logit}_{i,j}))]$, where $\lambda$ is a real constant.

Since the network loss function includes $\Sigma_{j\neq 0}|z_{i,j}|$, the training section trains the neural network so as to reduce activation levels (e.g., output values) of nodes of $j\neq 0$ (e.g., $n_{0,1}$, $n_{0,2}$, $n_{0,3}$, $n_{1,1}$, $n_{1,2}$, $n_{1,3}$, $n_{2,1}$, $n_{2,2}$, and $n_{2,3}$). In other words, the training section can concentrate activation on nodes of the prioritized class (e.g., Class 0).

Due to the priority on the specific class, nodes of the specific class (e.g., Class 0) can be highly activated for some variables, and nodes of other classes can be still activated in spite of the priority. In other embodiments, the network loss function can include $\alpha'\Sigma_{j=0}|z_{i,j}|$, instead of $\alpha\Sigma_{j\neq 0}|z_{i,j}|$, where $\alpha'$ is less than 0, and thereby substantially the same result can be achieved.

FIG. 6 shows levels of activations by degrees of shading of nodes. In the embodiment of FIG. 6, the node $n_{0,0}$ of Class 0 is the most activated node in the first set 510, the node $n_{1,1}$ of Class 1 is the most activated node in the second set 520, and the $n_{2,3}$ of Class 3 and nodes $n_{2,1}$ of Class 1 are the most activated and the second most activated nodes, respectively, in the third set 530.

At S430, an identifying section such as the identifying section 130 can identify a set of nodes of the output layer that are not contributing outputs of the neural network during the training.

In an embodiment, the identifying section can identify a variable of the plurality of variables of which only a particular class is activated regardless of input data to the neural network. In an embodiment, the particular class can be a prioritized class 602 (e.g., Class 0 in FIG. 6). In the embodiment of FIG. 6, the identifying section can identify the first set 510, among the sets 510-530, in which the node $n_{0,0}$ of the prioritized Class 0 is highly activated.

In some embodiments, the particular class can be not only a prioritized class 602 (e.g., Class 0) but also other classes. In the embodiment of FIG. 6, the identifying section can identify not only the first set 510 but also the second set 520, among the sets 510-530, in which the nodes $n_{0,0}$ of the prioritized Class 0 and the nodes $n_{1,1}$ of the non-prioritized Class 1 are highly activated.

In an embodiment, the identifying section can identify a variable if the node of the particular class and the variable is activated above a threshold activation level during the training. For example, the identifying section can identify a variable if an average output of the node of the particular class and the variable exceeds a threshold (e.g., 0.9). In another example, the identifying section can identify a variable if a ratio of an average output of the node of the particular class and the variable against a sum of average outputs of all nodes of the variable (e.g., a ratio of an average output of $z_{0,0}$ against a sum of average outputs of $z_{0,0}$-$z_{0,3}$) is larger than a threshold (e.g., 0.9).

At S440, a deleting section such as the deleting section 140 can delete the set of nodes identified by the identifying section at S430. In an embodiment, the deleting section can delete all nodes of the variable identified by the identified section.

Figure 7:
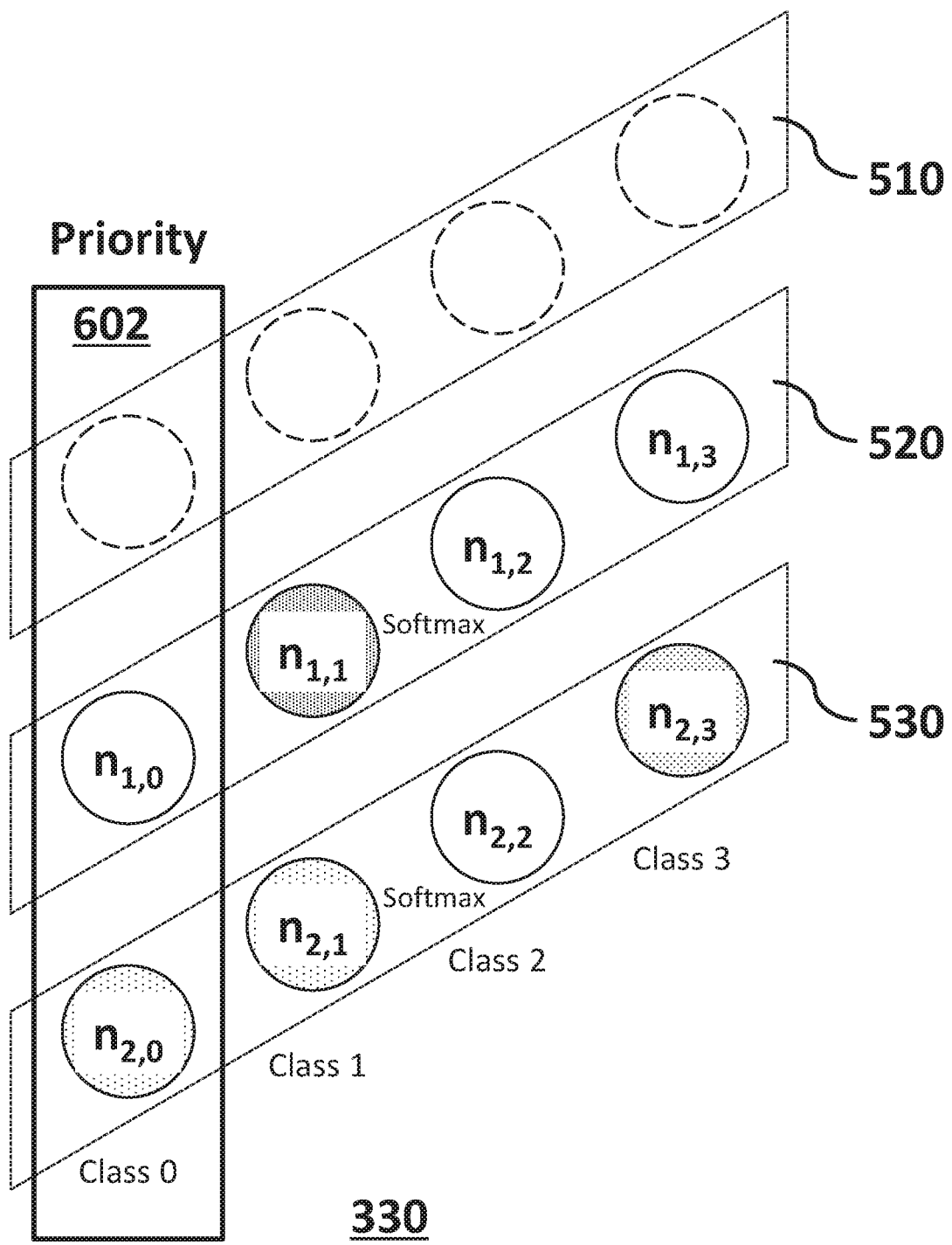
FIG. 7 shows deleting a variable according to an embodiment of the present invention.

FIG. 7 shows deleting a variable by the deleting section according to an embodiment of the present invention. In the embodiment of FIG. 7, the deleting section may delete the nodes $n_{0,0}$-$n_{0,3}$ in the first set 510 from the output layer 330 of FIG. 6. Since activations of nodes $n_{0,0}$-$n_{0,3}$ may not be affected by the input data, the nodes of the first set 510 may not be necessary for the neural network to perform accurately at runtime.

Thereby, the deleting section can reduce a size of the output layer 330 without a loss of accuracy. In an embodiment, the deleting section can further delete nodes in the previous layer 320 that are connected to the deleted nodes as necessary.

In an embodiment, the operations of S430-S440 can be performed after the operation of S420. In an embodiment, the apparatus can repeat the operations of S420-S440. For example, after the operation of S440, the training section can again perform the operation of S420 for the neural network. Thereby, the apparatus can gradually minimize a size of the neural network.

At S470, a replacing section, such as the replacing section 150, can replace the output layer used at the training with an argmax layer. In an embodiment, the replacing section can replace each of the softmax layers corresponding to the plurality of variables with an argmax layer. After the replacement, a node $n_{i,j}$ can output an argmax value $z'_{i,j}$ from the following equation:

$$z'_{i,j}=\text{Argmax}_j^i(\text{logit}_{i,j}) \quad\quad\quad \text{EQ2}$$

Since $\text{logit}_{i,j}$ in the equation EQ2 is the same as that in the equation EQ1, a result of the training (e.g., weights and/or other parameters in the neural network) can be reflected in the neural network after the replacement.

Figure 8:
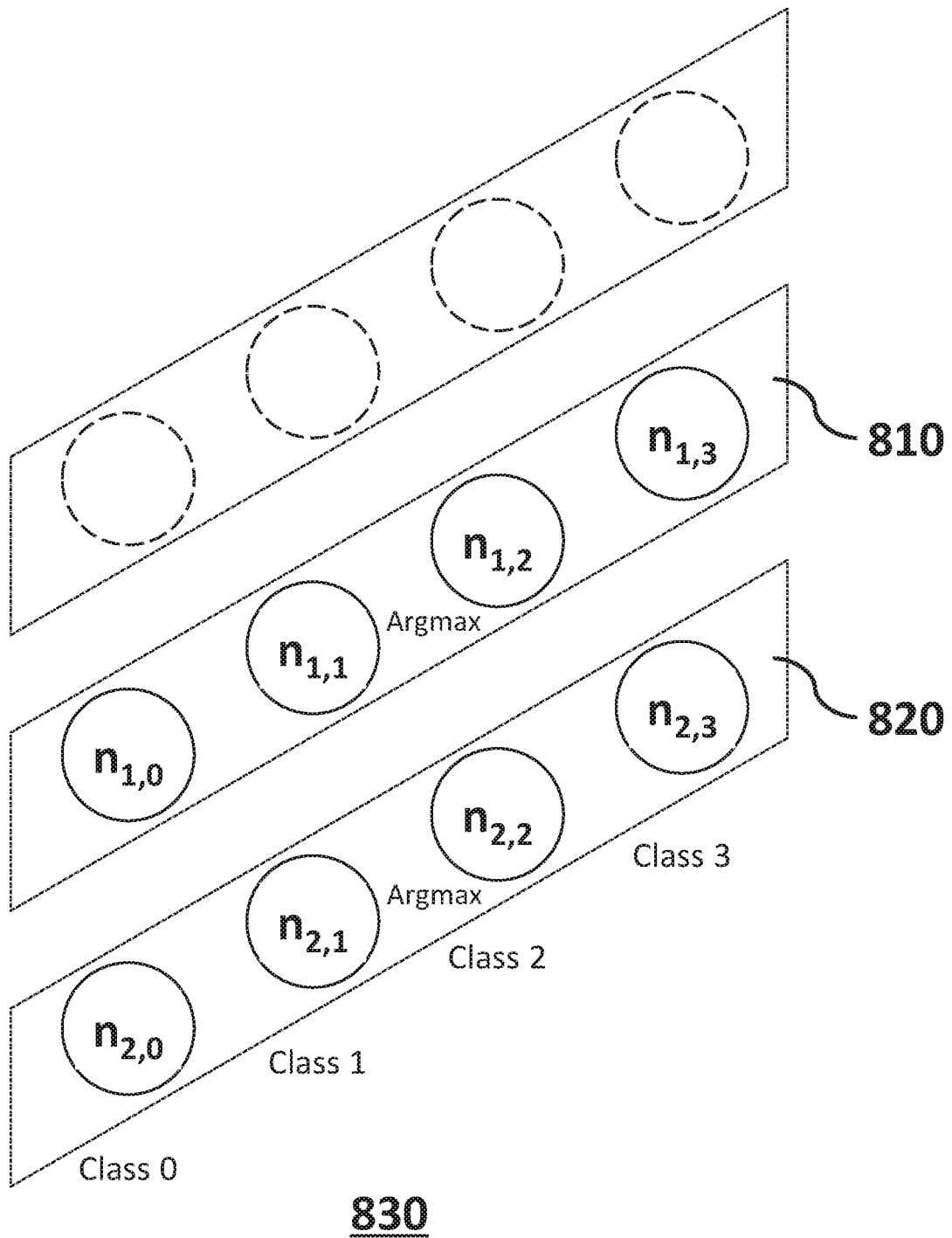
FIG. 8 shows replacing the output layer according to an embodiment of the present invention.

FIG. 8 shows replacing the output layer 830 according to an embodiment of the present invention. In an embodiment, the replacing section can replace softmax layers of the output layer 330 of FIG. 7 with an argmax layer 810 and an argmax layer 820. The argmax layer 810 can correspond to the second set 520, and the argmax layer 820 can correspond to the third set 530.

The argmax layer can output 1 from the most activated node and output 0 from other nodes in the layer for each variable. For argmax layer 810, the most activated node among $n_{1,0}$-$n_{1,3}$ can output 1 and the other nodes among $n_{1,0}$-$n_{1,3}$ can output 0. For argmax layer 820, the most activated node among $n_{2,0}$-$n_{2,3}$ can output 1 and the other nodes among $n_{2,0}$-$n_{2,3}$ can output 0.

By replacing the output layer with the argmax layer, the apparatus can eliminate instability of the encoder due to sampling parameter $g_{ij}$ of the Gumbel softmax. Thereby, according to at least some of the embodiments of the present invention, the apparatus can train a stable neural network having adequate size with less computational resources. In an embodiment, in alternation of the Gumbel softmax, DVAE++ (Discrete Variational Autoencoders with Overlapping Transformations) can be used.

After the replacement, the encoder can be used for any of several purposes. In an embodiment, output from the encoder is used for input to a problem solver.

In the embodiments of FIGS. 6-8, only one class is shown to be prioritized. In other embodiments two or more classes can be prioritized. In those embodiments, the network loss function can include weighted activation levels of the plurality of nodes of two or more classes (e.g., all classes). The weighted activation levels can be weighted according to the priority of the corresponding class.

Figure 9:
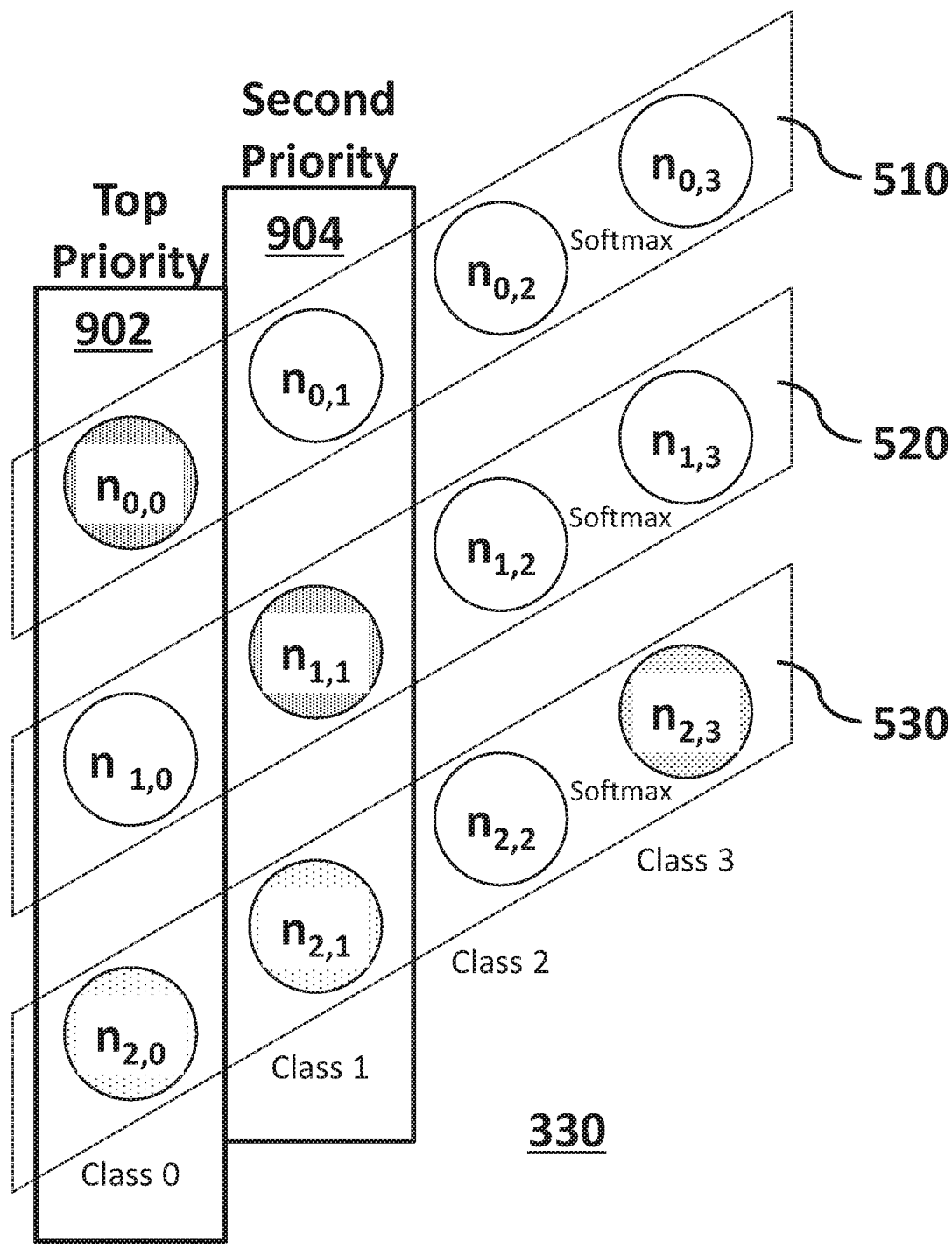
FIG. 9 shows another class priority during the training according to an embodiment of the present invention.

FIG. 9 shows another class priority during the training according to an embodiment of the present invention. In an embodiment, the network loss function can include activation levels of the plurality of nodes except nodes of two or more classes. In the embodiment of FIG. 9, the training section can put the highest priority 902 on Class 0, the second highest priority 904 on Class 1, and no priority on Classes 2-3 at the training of S420.

In a specific embodiment, the training section can use:

$$\|Y-X\|+\langle GS_{variational\ loss}\rangle+\alpha\Sigma_{j\neq0}|z_{i,j}|+\beta\Sigma_{j\neq0,1}|z_{i,j}| \quad \text{EQ3,}$$

as the network loss function, where $\beta$ is another balance parameter and can be greater than 0. In an embodiment, $\alpha$ can be greater than 0 or equal to 0. In the embodiment, the activation levels can be weighted by the parameters $\alpha$ and $\beta$. In the embodiment, the training section can concentrate activation on nodes of Class 0-1, in particular Class 0. In the embodiment of FIG. 9, the identifying section can identify a variable of the plurality of variables of which only one class is activated regardless of input data to the neural network at the operation of S430. In other embodiments, the network loss function can include $\alpha'\Sigma_{j=0}|z_{i,j}|$ and $\beta'\Sigma_{j=0,1}|z_{i,j}|$, instead of $\alpha\Sigma_{j\neq0}|z_{i,j}|$ and $\beta\Sigma_{j\neq0,1}|z_{i,j}|$ where $\alpha'$ and $\beta'$ are less than 0, and thereby substantially the same result can be achieved.

Figure 10:
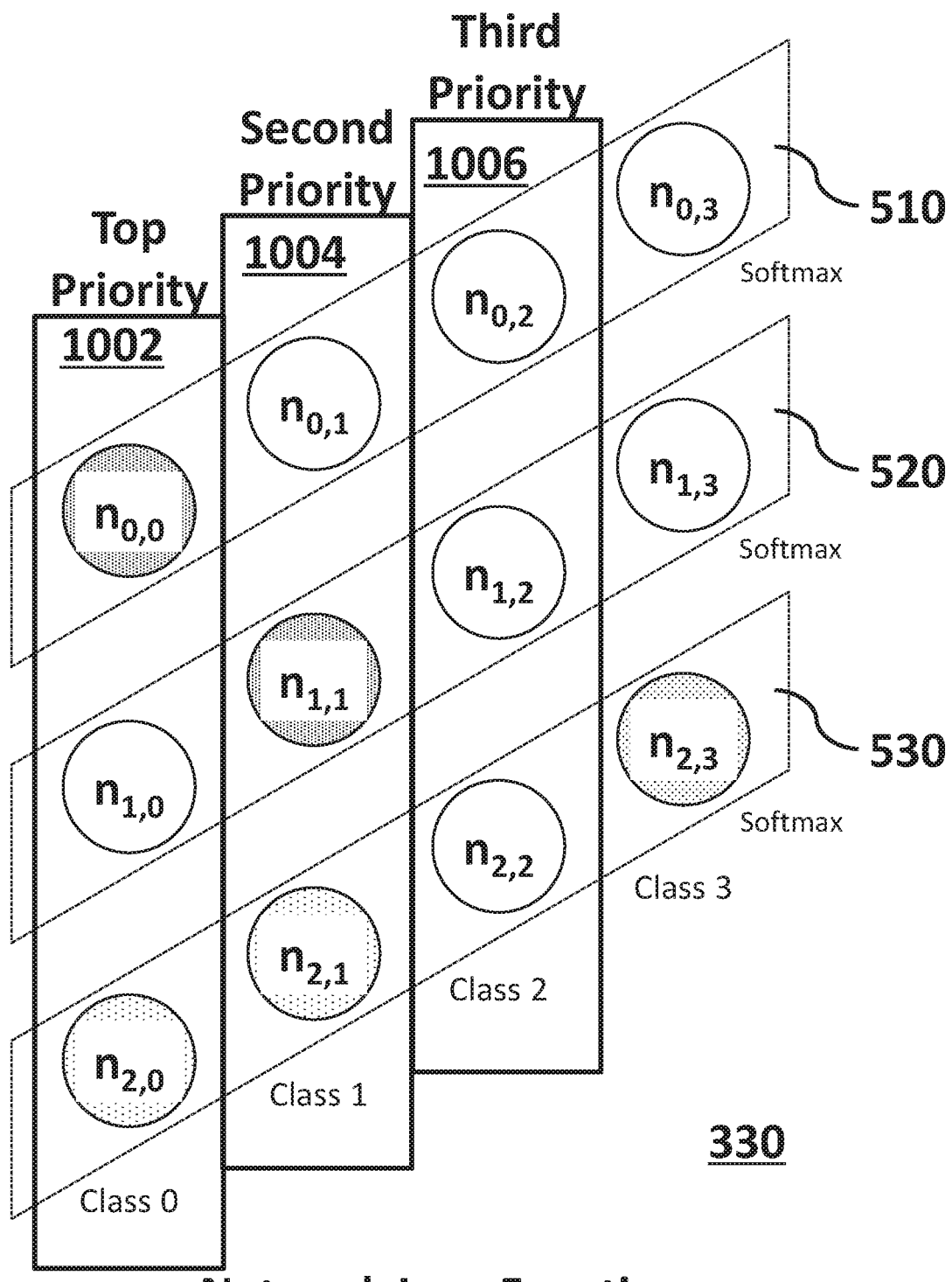
FIG. 10 shows the other class priority during the training according to an embodiment of the present invention.

FIG. 10 shows the other class priority during the training according to an embodiment of the present invention. In an embodiment, the network loss function can include weighted activation levels of the plurality of nodes of all classes. In the embodiment of FIG. 10, the training section can put the highest priority 1002 on Class 0, the second highest priority 1004 on Class 1, the third highest priority 1006 on Class 2 and no priority on Class 3 at the training of S420.

In a specific embodiment, the training section can use:

$$\|Y-X\|+\langle GS_{variational\ loss}\rangle+\alpha\Sigma_{j\neq0}|z_{i,j}|+\beta\Sigma_{j\neq0,1}|z_{i,j}|+\gamma\Sigma_{j\neq0,1,2}|z_{i,j}| \quad \text{EQ4,}$$

as the network loss function, where $\gamma$ is the other balance parameter and can be greater than 0. In an embodiment, $\alpha$ and $\beta$ can be greater than 0 or equal to 0. In the embodiment, the activation levels can be weighted by the parameters $\alpha$, $\beta$ and $\gamma$. In the embodiment, the training section can concentrate activation on nodes of Class 0-2, in particular Class 0 when $\alpha>0$. In the embodiment of FIG. 10, the identifying section can identify a variable of the plurality of variables of which only one class is activated regardless of input data to the neural network at the operation of S430. In other embodiments, the network loss function can include $\alpha'\Sigma_{j=0}|z_{i,j}|$, $\beta'\Sigma_{j=0,1}|z_{i,j}|$ and $\gamma'\Sigma_{j=0,1,2}|z_{i,j}|$, instead of $\alpha\Sigma_{j\neq0}|z_{i,j}|$, $\beta\Sigma_{j\neq0,1}|z_{i,j}|$, and $\gamma\Sigma_{j\neq0,1,2}|z_{i,j}|$ and where $\alpha'$, $\beta'$ and $\gamma'$ are less than 0, and thereby substantially the same result can be achieved.

In the embodiments explained above, a variable is identified at S430 and nodes of the identified variable are deleted at S440. In other embodiments, nodes of a specific class can be further deleted at S440.

In an embodiment, the identifying section can identify a class that is not activated throughout the plurality of variables regardless of input data to the neural network at S430, in addition to or instead of identifying a variable. Then, the deleting section can delete nodes corresponding to the identified class throughout the plurality of variables at S440, in addition to or instead of deleting nodes of the identified variable.

In the embodiment of FIG. 6, the identifying section can identify Class 2, among Classes 0-3, in response to determining at S430 that the nodes $n_{0,2}$-$n_{2,2}$ are activated lower than a threshold regardless of input data to the neural network during the training of S420. Then, the deleting section can delete the nodes $n_{0,2}$-$n_{2,2}$ at S440.

Figure 11:
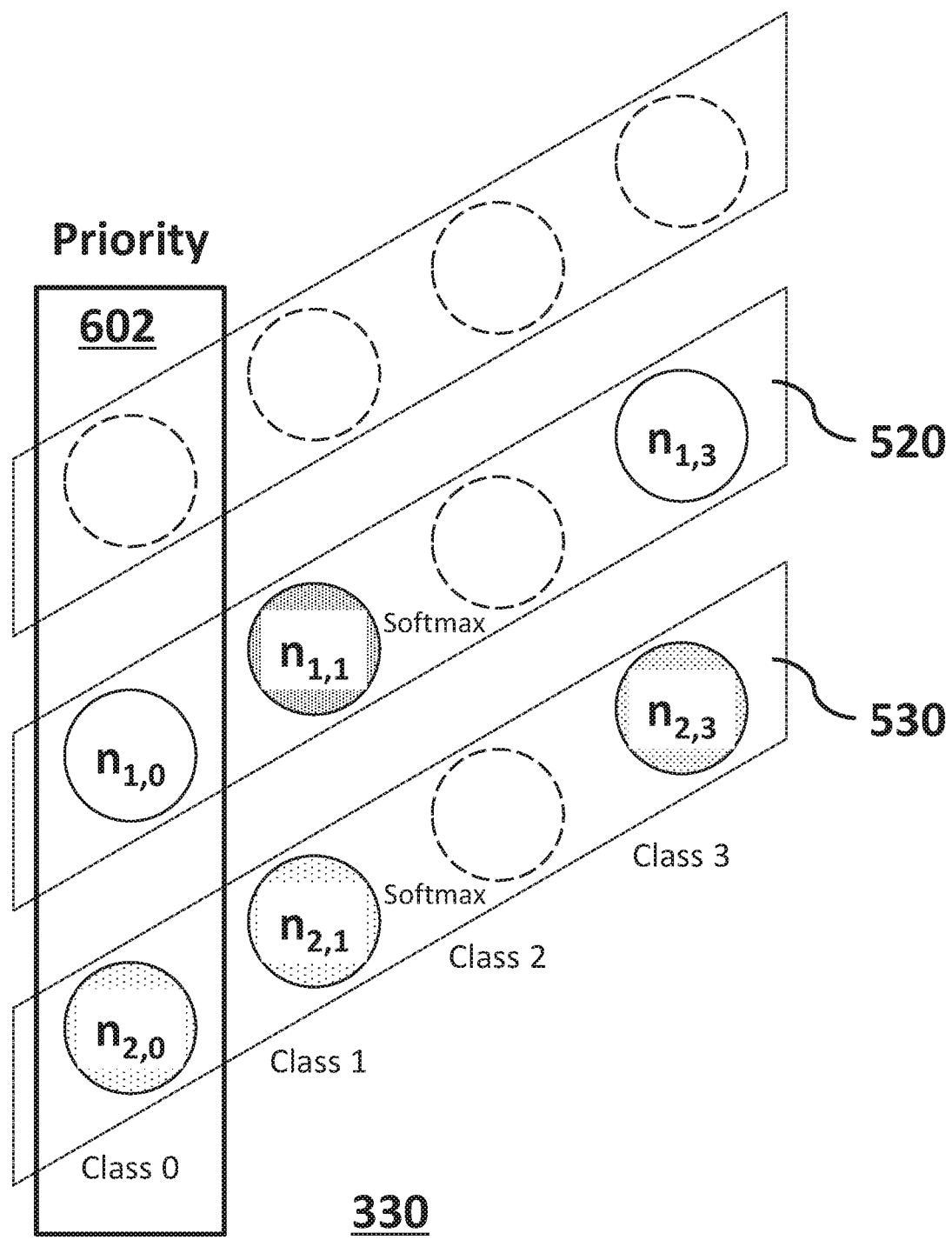
FIG. 11 shows deleting a class according to an embodiment of the present invention.

FIG. 11 shows deleting a class according to an embodiment of the present invention. In the embodiment of FIG. 11, the deleting section can further delete the nodes $n_{1,2}$-$n_{2,2}$ from the output layer 330 of FIG. 7. Since the nodes $n_{1,2}$-$n_{2,2}$ may not be activated at runtime, too, these nodes may not be necessary for the neural network to perform accurately at runtime. Thereby, the deleting section may reduce a size of the output layer 330 without a loss of accuracy.

Embodiments where the neural network trained is an encoder of a VAE or auto encoder are mainly explained herein. In other embodiments, the neural network can be other types of neural networks. For example, the neural network can be a convolutional neural network (or CNN). In another example, the neural network can be variational sequence-to-sequence encoder-decoder model for a natural language model.

Various embodiments of the present invention can be described with reference to flowcharts and block diagrams whose blocks can represent (1) steps of processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

The present invention can be a system, a method, and/or a computer program product at any possible technical detail level of integration. The computer program product can include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server.

In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement embodiments of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s).

In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
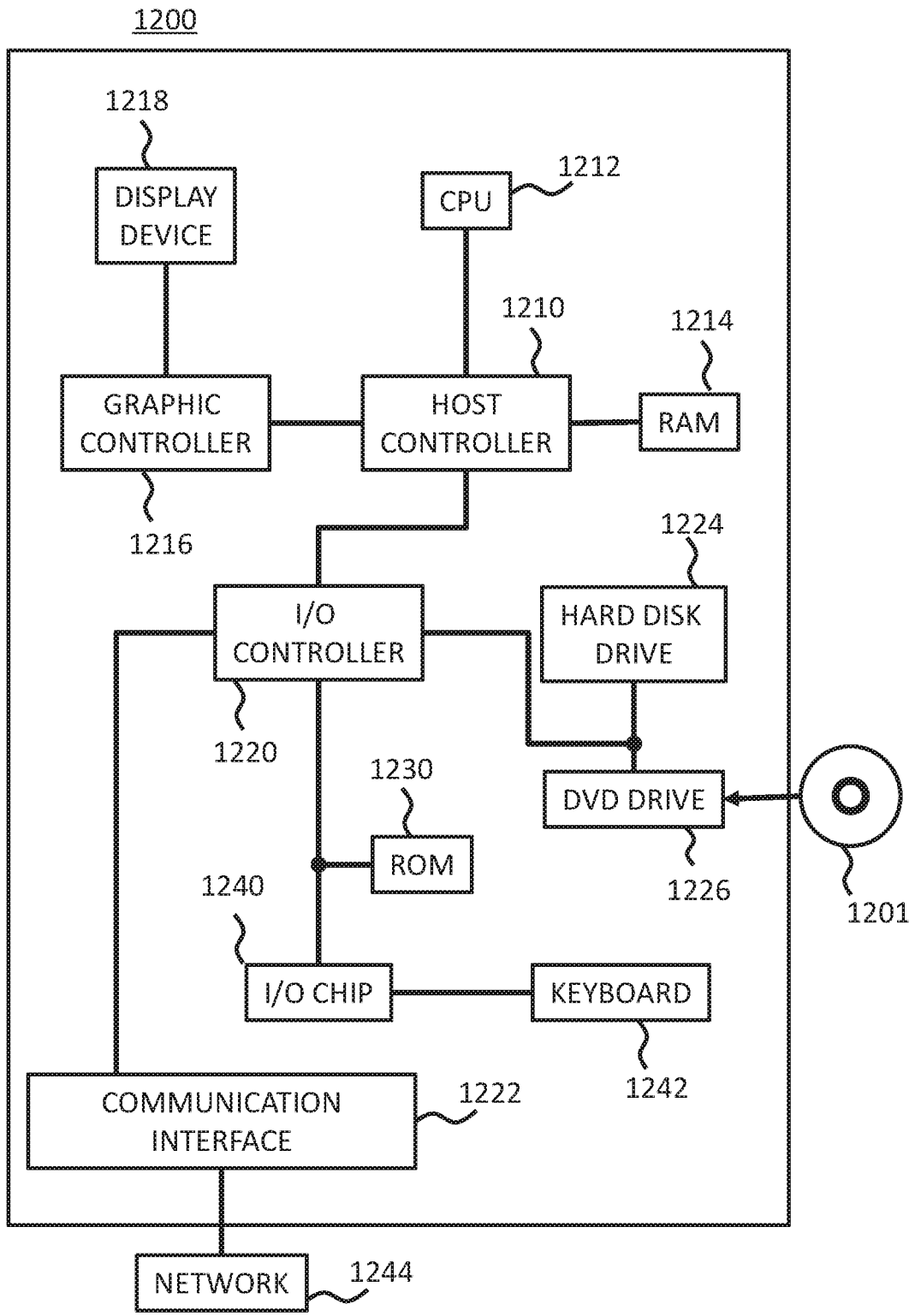
FIG. 12 shows an exemplary hardware configuration of a computer that functions as a system, according to an embodiment of the present invention.

FIG. 12 shows an example of a computer 1200 in which embodiments of the present invention can be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program can be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices (not shown) via a network 1244. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 can also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method can be constituted by realizing the operation or processing of information in accordance with the usage of the computer 1200.

For example, when communication is performed between the computer 1200 and an external device, the CPU 1212 can execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 can cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 can then write back the processed data to the external recording medium.

Various types of information, such as various types of programs, data, tables, and databases, can be stored in the recording medium to undergo information processing. The CPU 1212 can perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 can search for information in a file, a database, etc., in the recording medium. For example, when a plurality of entries, each having an attribute value of a first attribute associated with an attribute value of a second attribute, are stored in the recording medium, the CPU 1212 can search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules can be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method for neural network training, comprising:
    training a neural network having an output layer that utilizes continuous values so that the output layer of the neural network will tend to output discrete values such that a temperature parameter $\tau$ is utilized for annealing during the training by decreasing $\tau$ from a positive value to 0, wherein a softmax value $z_{i,j}$ approaches a discrete value from a continuous value as $\tau$ approaches 0, wherein the output layer includes a plurality of nodes, each node corresponding to one of a plurality of classes;
    assigning a priority to at least one class of the plurality of classes; and
    activating the nodes by priority according to the corresponding class of the plurality of classes.

2. The method of claim 1, wherein the training further includes regularizing each class by minimizing a network loss function that applies a penalty term associated with the priority of the corresponding class.

3. The method of claim 2, wherein the network loss function includes activation levels of the plurality of nodes except nodes of one class.

4. The method of claim 2, wherein the network loss function includes activation levels of the plurality of nodes except nodes of two or more classes.

5. The method of claim 2, wherein the network loss function includes weighted activation levels of the plurality of nodes of all classes, the weighted activation levels being weighted according to the priority of the corresponding class.

6. The method of claim 1, wherein the output layer comprises a plurality of sets of nodes, each set of nodes corresponding to one of a plurality of variables, and each set of the plurality of sets includes one of the plurality of nodes corresponding to each class,
wherein the method further comprises:
identifying a variable of the plurality of variables of which only a particular class is activated regardless of input data to the neural network, and
deleting a set of nodes corresponding to the identified variable.

7. The method of claim 1, wherein the output layer comprises a plurality of sets of nodes, each set of nodes corresponding to one of a plurality of variables, and each set of the plurality of sets includes one of the plurality of nodes corresponding to each class,
wherein the method further comprises:
identifying a class that is not activated throughout the plurality of variables regardless of input data to the neural network, and
deleting nodes corresponding to the identified class throughout the plurality of variables.

8. The method of claim 6, wherein, during the training of the neural network, the plurality of nodes of each set calculate the softmax value based at least on logit values of outputs from nodes in a previous layer connected to the output layer and a sample of a predetermined distribution.

9. The method of claim 6, wherein, during the training of the neural network, the plurality of nodes of each set calculate the softmax value base at least on logit values of outputs from nodes of a previous layer connected to the output layer, a sample of Gumbel distribution, and a temperature parameter.

10. The method of claim 8, further comprises:
replacing the output layer used at the training with an argmax layer.

11. The method of claim 1, wherein the neural network is a Variational Autoencoder (VAE), and the output layer is included in an encoder of the VAE.

12. The method of claim 11, wherein output from the encoder is used for input to a problem solver.

13. An apparatus comprising
a processor or a programmable circuitry; and
one or more computer readable mediums collectively including instructions that, when executed by the processor or the programmable circuitry, cause the processor or the programmable circuitry to perform operations including:
training a neural network having an output layer that utilizes continuous values so that the output layer of the neural network will tend to output discrete values such that a temperature parameter $\tau$ is utilized for annealing during the training by decreasing $\tau$ from a positive value to 0, wherein a softmax value $z_{i,j}$ approaches a discrete value from a continuous value as $\tau$ approaches 0, wherein the output layer includes a plurality of nodes, each node corresponding to one of a plurality of classes;
assigning a priority to at least one class of the plurality of classes; and
activating the nodes by priority according to the corresponding class of the plurality of classes.

14. The apparatus of claim 13, wherein the training further includes regularizing each class by minimizing a network loss function that applies a penalty term associated with the priority of the corresponding class.

15. The apparatus of claim 14, wherein the network loss function includes activation levels of the plurality of nodes except nodes of one class.

16. The apparatus of claim 14, wherein the network loss function includes activation levels of the plurality of nodes except nodes of two or more classes.

17. A computer program product including one or more computer readable storage mediums collectively storing program instructions that are executable by a processor or programmable circuitry to cause the processor or programmable circuitry to perform operations comprising:
training a neural network having an output layer that utilizes continuous values so that the output layer of the neural network will tend to output discrete values such that a temperature parameter $\tau$ is utilized for annealing during the training by decreasing $\tau$ from a positive value to 0, wherein a softmax value $z_{i,j}$ approaches a discrete value from a continuous value as $\tau$ approaches 0, wherein the output layer includes a plurality of nodes, each node corresponding to one of a plurality of classes;
assigning a priority to at least one class of the plurality of classes; and
activating the nodes by priority according to the corresponding class of the plurality of classes.

18. The computer program product of claim 17, wherein the training further includes regularizing each class by minimizing a network loss function that applies a penalty term associated with the priority of the corresponding class.

19. The computer program product of claim 18, wherein the network loss function includes activation levels of the plurality of nodes except nodes of one class.

20. The computer program product of claim 18, wherein the network loss function includes activation levels of the plurality of nodes except nodes of two or more classes.

* * * * *